United States Patent Office 3,377,404
Patented Apr. 9, 1968

3,377,404
POLYMERIZATION METHOD
Robert P. Zelinski, Bartlesville, Okla., assignor to Phillips Petroleum Company, a corporation of Delaware
No Drawing. Continuation-in-part of application Ser. No. 64,280, Oct. 24, 1960. This application Oct. 6, 1964, Ser. No. 401,960
9 Claims. (Cl. 260—680)

This application is a continuation-in-part of copending application Ser. No. 64,280, filed Oct. 24, 1960, now abandoned.

This invention relates to a method of polymerizing conjugated dienes and to the product of this polymerization.

It has been disclosed in copending application Ser. No. 772,167 of Uraneck, Short, Hsieh and Zelinski, filed Nov. 6, 1958, now U.S. Patent 3,135,716, that highly useful polymeric products can be obtained by polymerizing vinylidine-containing monomers in the presence of an organo alkali metal catalyst and subsequently reacting the resulting polymer containing active alkali metal end groups with a reagent which will couple the polymer molecules or replace the alkali metal with more stable reactive end groups. The utilization of these reactive terminal groups on the polymer molecule enables substantially more effective cures since all of the molecule can be tied into the crosslinked structure. Also by simple coupling arrangements alone or with auxiliary curing, liquid polymers can be readily converted into solids and soft tacky polymers can be made quite rigid. The term "telechelic" has been coined to define these terminally reactive polymers. As used in this specification, telechelic polymers means polymers of vinylidine-containing monomers which contain a reactive group on each end of the polymer molecule.

Organo dilithium initiators employed for the production of polymers containing terminal reactive groups are generally prepared in polar solvents such as diethyl ether or tetrahydrofuran and when used for diene polymerization a considerable amount of 1,2-addition and/or 3,4-addition occurs. In other words, the product has a higher vinyl content than may be desired. By "vinyl content" I mean to include not only vinyl branching but also vinylidene branching such as the alpha-methylvinyl branching which occurs by the 3,4-addition of isoprene. Reduction in the vinyl content lowers the freeze point of these polymers and is, therefore, of particular significance when these polymers are to be used at low temperatures. For example it has been pointed out by Short et al. in Rubber Chemistry and Technology 32, No. 2, pages 614–627, that polybutadienes of high cis content can be compounded to prepare vulcanizates which remain flexible at very low temperatures whereas the vinyl polybutadienes are seriously limited in their usefulness as elastomers at low temperatures. It has further been found that compounded and cured polymers of conjugated dienes containing a low vinyl content have higher elongations at very low temperatures, for example at about —40 to —70° F., and are, therefore, more resistant to shock than are similar compositions made from polymers having higher vinyl content.

For many uses it is desirable to work with liquid polymers that can be molded by casting and then cured to a solid, rubbery state. While the molecular weight of organolithium-initiated polymers can be regulated by varying the monomer-initiator ratio, this approach requires using higher amounts of initiator to effect a desired reduction in the molecular weight of the polymer. Maintaining a relatively low molecular weight for the polymer is especially important where the active polymer is treated in solution to replace the lithium atoms with more stable reactive groups. Contacting the polymer with reagents in such a process can be significantly more efficient if the viscosity of the polymer is kept low.

I have now discovered that a polymer of a conjugated diene having substantially lower vinyl content and lower inherent viscosity can be prepared by making an organo polylithium polymerization initiator in a polar solvent solubilizing the initiator by reacting the initiator with a small amount of conjugated diene, then replacing a substantial portion of the polar solvent with a hydrocarbon diluent, and thereafter contacting the solubilized organo polylithium initiator with the conjugated diene in the hydrocarbon diluent substantially reduced in polar solvent content. When the initiator is "solubilized" it is made soluble in the hydrocarbon diluent. I have found that the presence of this polar solvent in the polymerization mixture increases the amount of vinyl content in the final polymer and also that this solvent in which the polylithium organo initiator is originally prepared can be removed and replaced with hydrocarbon diluent without impairing the effectiveness of the initiator in the polymerization reaction. Also, by solubilizing the initiator before removing the polar solvent, the polymer formed has a much lower viscosity than would otherwise be formed. The polymer also has a narrower molecular weight distribution.

Care must be exercised in removing the polar solvent from the organo polylithium initiator. A number of courses can be taken to accomplish this. For example, the polar solvent can be evaporated leaving a solid residue after which the hydrocarbon diluent is added and the polylithium initiator is dissolved therein. Alternatively, hydrocarbon diluent can be added to the solution of organo polylithium initiator in a polar solvent and the polar solvent removed by distillation. Solubility difficulties of the organo polylithium initiator in a hydrocarbon diluent are overcome by polymerizing a small amount of conjugated diene and thereby incorporating this conjugated diene into the initiator and making it more soluble in the hydrocarbon diluent. This amount of conjugated diene should be held as small as possible since this step is effected in the presence of the polar solvent and polymerization carried out at this stage produces a segment of vinyl polymer which is incorporated in the finished product.

It is an object of my invention to provide a method of preparing a low molecular weight polymer of a conjugated diene having substantially reduced vinyl content.

Another object of my invention is to provide a method for polymerizing a conjugated diene using an organo polylithium initiator whereby substantially all of the polar solvent in which the initiator is originally prepared is removed from the system prior to polymerization of the conjugated diene.

Still another object of my invention is to provide a conjugated diene polymer having a low vinyl content and low inherent viscosity and/or narrow molecular weight distribution.

Other objects, advantages, and features of my invention will be apparent to those skilled in the art from the following discussion.

The polymers which can be prepared according to this invention are polymers of conjugated dienes containing from 4 to 12 carbon atoms and preferably from 4 to 8 carbon atoms per molecule. Examples of these compounds include the following: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl - 1,3 - butadiene, 2,3-diethyl-1,3-butadiene, 2,3-di-n-propyl - 1,3 - butadiene, 2-methyl-3-isopropyl-1,3-butadiene, and the like. Conjugated dienes containing alkoxy substituents along the chain can also be employed, such as 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene, and allowing it to polymerize. It is preferred, however, to carry out the polymerization with conjugated diolefins, such as butadiene with isoprene and piperylene also being especially suitable.

In addition to homopolymers and copolymers of conjugated dienes, copolymers of conjugated dienes with other monomers containing a $CH_2=C<$ group, such as vinyl-substituted aromatic compounds, can be made by the process of this invention. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include 3-methylstyrene (3-vinyltoluene), 3,5-diethylstyrene, 4-n-propylstyrene, 2,4,6-trimethylstyrene, 4-dodecylstyrene, 3-methyl-5-n-hexylstyrene, 4-cyclohexylstyrene, 4-phenylstyrene, 2-ethyl-4-benzylstyrene, 4-p-tolylstyrene, 3,5-diphenylstyrene, 2,4,6-tri-tert-butylstyrene, 2,3,4,5-tetramethylstyrene, 4-(4-phenyl-n-butyl)styrene, 3-(4-n-hexylphenyl)-styrene, 4-methoxystyrene, 3,5-diphenoxystyrene, 3-decoxystyrene, 2,6-dimethyl-4-hexoxystyrene, 4-dimethylaminostyrene, 3,5-diethylaminostyrene, 4-methoxy-6-di-n-propylaminostyrene, 4,5-dimethyl-1-vinylnaphthalene, 3-ethyl-1-vinylnaphthalene, 6-isopropyl-1-vinylnaphthalene, 2,4-diisopropyl-1-vinylnaphthalene, 3,6-di-p-tolyl-1-vinylnaphthalene, 6-cyclohexyl-1-vinylnaphthalene, 4,5-diethyl-8-octyl-1-vinylnaphthalene, 3,4,5,6-tetramethyl - 1 - vinylnaphthalene, 3,6-di-n-hexyl-1-vinylnaphthalene, 8-phenyl-1-vinylnaphthalene, 5-(2,4,6-trimethylphenyl) - 1 - vinylnaphthalene, 3,6-diethyl-2-vinylnaphthalene, 7-dodecyl-2-vinylnaphthalene, 4-n-propyl-5-n-butyl - 2 - vinylnaphthalene, 6-benzyl-2-vinylnaphthalene, 3-methyl-5,6-diethyl-8-n-propyl-2-vinylnaphthalene, 4-o-tolyl - 2 - vinylnaphthalene, 5-(3-phenyl-n-propyl) - 2 - vinylnaphthalene, 4-methoxy-1-vinylnaphthalene, 6-phenoxyl - 1 - vinylnaphthalene, 3,6-dimethylamino-1-vinylnaphthalene, 7-dihexoxy-2-vinylnaphthalene, and the like. Block or random copolymers of conjugated dienes and vinyl-substituted aromatic compounds can be formed. The presence of a small amount of polar compound such as the solvent used in preparing the initiator encourages random copolymerization between conjugated dienes and vinyl-substituted aromatic compounds.

Block copolymers can also be prepared from conjugated dienes and polar monomers which are introduced after the conjugated diene has polymerized. These polar monomers include vinylpyridines and vinylquinolines such as 2-vinylpyridine, 4-vinylpyridine, 3,5-diethyl-4-vinylpyridine, 5-methyl-2-vinylpyridine, 5-n-octyl-2-vinylpyridine, 3-n-dodecyl-2-vinylpyridine, 3,5-di-n-hexyl - 4 - vinylpyridine, 5-cyclohexyl - 2 - vinylpyridine, 4-phenyl-2-vinylpyridine, 3,5-di-tert-butyl - 2 - vinylpyridine, 3-benzyl-4-vinylpyridine, 6-methoxy - 2 - vinylpyridine, 4-phenoxy-2-vinylpyridine, 4-dimethylamino - 2 - vinylpyridine, 3,5-dimethyl-4-diamylamino - 2 - vinylpyridine, 2-vinylquinoline, 4-vinylquinoline, 2-tert-butyl - 4 - vinylquinoline, 3-methyl-4-vinylquinoline, 3-cyclohexyl - 4 - vinylquinoline, 3-methyl - 4 - ethoxy-2-vinylquinoline, 1-vinylisoquinoline, 3-vinylisoquinoline, 4-tert-dodecyl-1-vinylisoquinoline, 3-dimethylamino-3-vinylisoquinoline, 4-benzyl - 3 - vinylisoquinoline, 4-phenyl-1-vinylisoquinoline, and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N-dimethylacrylamide, N,N-diethylmethacrylamide, and the like. Vinylfuran and N-vinylcarbazole can also be used.

Telechelic polymers are prepared by polymerizing the above named monomers in the presence of an organo polylithium compound. These organo polylithium compounds contain from 2 to 4 lithium atoms per molecule. They are conveniently prepared in an ether medium in several ways, for example, by replacing halogens in an organic halide with lithium or by the direct addition of lithium to a double bond or by reacting an organic halide with a lithium containing compound. Lithium can also be added directly to a condensed ring aromatic compound, such as naphthalene, anthracene or phenanthrene or the lithium can be added to a polyaryl substituted ethylene such as stilbene (1,2-diphenylethylene).

Solubility problems can be overcome directly by forming adducts of conjugated dienes. Dilithio adducts of conjugated dienes such as butadiene, isoprene, piperylene, 2,3-dialkyl-1,3-butadienes such as 2,3-dimethyl-1,3-butadiene and the like can be prepared under conditions adjusted to minimize polymerization of the diene. In the preparation of these adducts generally the average number of diene units per 2 lithium atoms is below 10 and preferably below 7. The temperature of the preparation is preferably below 50° C. and the conjugated diene is used in a concentration generally not more than 3 molar and frequently 1.5 molar or less. Preferably the reaction mixture is thoroughly agitated and a minor amount of a polyaryl-substituted ethylene or a condensed ring aromatic compound can be added as a promoter for the reaction, generally in amounts ranging from 0.005 to 2 mole per mole of the conjugated diene. In preparing these adducts it is sometimes preferred to contact the lithium with only a portion of the conjugated diene and then add the remainder in one or more portions. This method of operation serves to minimize polymerization of the diene and is a convenient method of producing a fairly high concentration of adduct.

Polylithium polymerization initiators are prepared in polar solvents and ethers are generally employed for this purpose. The ethers which are preferred are those which are considered fairly inactive, for example, aliphatic monoethers having the formula R'OR' wherein each R' is an alkyl group containing 2 to 12 carbon atoms, such as diethyl ether, diisopropyl ether, di-n-butyl ether, ethyl n-propyl ether and ethyl isobutyl ether. While not to be preferred, the more active compounds such as cyclic and methyl ethers typified by dimethyl ether, tetrahydrofuran and dimethoxyethane can be used. As pointed out above it is desirable to minimize polymerization in the preparation of the initiator in order that the adduct can be produced in fairly high concentration. It is also highly desirable that the polymerization of a conjugated diene used in the solubilization of an adduct be held to a minimum because the polymerization at this stage tends to be substantially all vinyl and since this is incorporated into the final polymer it substantially affects the vinyl content of the finished product.

The initiators are prepared by first contacting lithium in excess, generally about 5 to 50 percent excess, with the organic halide, the condensed ring aromatic compound or the polyaryl substituted ethylene in ether solution. The mixture is agitated and the temperature can vary over a broad range, for example, from —40 to 170° F. The time required depends upon the nature of the reagents and can be from about 1 hour to 150 hours or more. The organic halides are preferably hydrocarbon compounds containing 2 to 4 halogen atoms, such as 1,4-dichlorobutane, 1,6-diiodohexane, 1,10-dibromodecane, 1,4-diiodo-2-butene, 1,3-dichlorobenzene, 1,4-dichlorocyclohexane, and the like. The condensed ring aromatic compounds include alkyl-substituted condensed ring aromatics having 1 to 3 such alkyl groups with up to 15 carbon atoms in the total of such groups. Examples include 2-methylnaphthalene, 1-methylnaphthalene, 1,2-di-n-butylnaphthalene, 2-n-dodecylanthracene, 1,2,6-triisopropylnaphthalene, and the like. Examples of polyaryl-substituted ethylenes include 1,1-diphenylethylene, 1,2-diphenylethylene, triphenylethylene, tetraphenylethylene, 1-phenyl-1-naphthylethylene, 1,2-di-2-naphthylethylene, and the like. A small portion of the diene solubilizing agent can be present during this first step of initiator preparation.

The initiator found in the first step can be represented by the formula $RLi_x$ where $x$ is an integer of 2 to 4 and R is a hydrocarbon radical selected from the group consisting of aliphatic, cycloaliphatic and aromatic radicals, preferably having 1 to 20 carbon atoms. Examples of suitable dilithium organic polymerization initiators which are prepared in polar solvents are 1,4-dilithiobutane, 1,6-dilithiohexane, 1,10-dilithiodecane, 1,20-dilithioeicosane, 1,4-dilithio-2-methyl-2-butene, 1,4-dilithio-2-butene, dilithionaphthalene, dilithiomethylnaphthalene, 4,4'-dilithiobiphenyl, dilithioanthracene, 1,1-dilithio-1,1-diphenylethane, 1,2-dilithio-1,2-diphenylethane, 1,2-dilithiotetraphenylethane, 1,2-dilithio-1-phenyl-1-naphthylethane, 1,2-dilithio-1,2-dinaphthylethane, 1,2-dilithiotrinaphthylethane, 1,4-dilithiocyclohexane, 1,3,5-trilithiocyclohexane, 1-lithio-4(2-lithiomethylphenyl)butane, 1,2-di(lithiobutyl)benzene, 1,3-dilithio-4-ethylbenzene, 1,5,12-trilithiododecane, 1,4-di(1,2-dilithio-2-phenylethyl)benzene, 1,5-dilithio-3-pentyne, dilithiophenanthrene, 1,2-dilithiotriphenylethane, dilithiomethane, 1,4-dilithio-1,1,4,4-tetraphenylbutane, 1,4-dilithio-1,4-diphenyl-1,4-dinaphthylbutane and the like.

The initiator formed in the first step is either a substitution product as formed from an organic halide, or an adduct of lithium and the condensed ring aromatic compound or the polyaryl-substituted ethylene. This product is contacted in the second, or solubilizing step with a small amount of conjugated diene as previously described. 1,3-butadiene and isoprene are preferred for this purpose. More than one kind of diene can be employed. For example, a small portion of one diene such as isoprene or 2,3-dimethylbutadiene can be present in the first step and 1,3-butadiene added in the second step. The amount of solubilizing agent is generally about 1 to 10 mols per mol of lithium compound, preferably 1 to 6 mols per mol. The temperature of the solubilizing step can be the same as for the polymerization but is generally in the range of 20 to 60° F., preferably below 50° F. Adding the diene slowly or in increments facilitates temperature control.

After the initiator has been treated in this manner it is soluble in hydrocarbon diluents. Just sufficient diene is added to achieve this result.

The polymerization of the conjugated diene in the presence of the dilithium organo initiator is carried out in a suitable diluent such as benzene, toluene, cyclohexane, methylcyclohexane, xylene, n-butane, n-hexane, n-heptane, isooctane and the like. Generally, the diluent is selected from hydrocarbons, for example, paraffins, cycloparaffins and aromatics containing from 4 to 10 carbon atoms per molecule. In the practice of my invention according to one embodiment the polar solvent is removed by evaporation and replaced with one of these hydrocarbon diluents. The monomer is then charged and the polymerization is carried out. In all cases the polymerization is carried out in an inert atmosphere such as an atmosphere of nitrogen or argon. In another procedure the initiator in the polar solvent is charged to an aliphatic or aromatic hydrocarbon diluent such as described above which is suitable for the polymerization medium and which has a higher boiling point than the polar solvent. The polar solvent is then removed by distillation and the monomer is charged. If the hydrocarbon diluent has a boiling point such that a substantial quantity of it is removed during the removal of the polar solvent then additional hydrocarbon diluent can be added prior to charging the monomer.

As previously stated, although the polymerization initiator as originally formed is soluble in the polar solvent it is not soluble in the hydrocarbon diluent. In this case it is desirable to add a small amount, generally less than about 20 weight percent of that subsequently charged, of the monomer and allow it to polymerize while still in the presence of the polar solvent. The polar solvent can then be removed by any means such as by distillation and replaced with the hydrocarbon diluent in which the modified initiator is now soluble. The remainder of the monomeric material can then be introduced and the polymerization continued. That portion of the product which is formed prior to the removal of the polar solvent serves as the initiator for the final polymerization step. This initial portion contains a substantial vinyl content and therefore it is desirable that the size of this portion be kept quite low and that only enough monomer be added in this stage to solubilize the initiator. A modification of the above methods involves charging the initiator solution and the polar solvent to a hydrocarbon solvent and then adding a small amount of monomeric material, allowing it to polymerize, thereafter removing the polar solvent and charging the remaining amount of the monomeric material. If necessary, additional hydrocarbon diluent can be introduced prior to charging the monomer. In this latter procedure the initial polymer formed before removal of the polar solvent is formed after the addition of substantial quantities of hydrocarbon diluent and therefore the concentration of the polar solvent is substantially reduced, thus correspondingly reducing the vinyl content in the polymer formed at this stage.

In the polymerization to form polymer having low vinyl content it is preferred that a conjugated diene be employed in a major amount of the monomers used. The amount of initiator which is used varies depending upon the polymer prepared and upon the molecular weight desired. According to the present invention the terminally reactive polymers thus formed are preferably liquids having molecular weights in the range of about 1000 to 20,000, preferably about 2500 to 10,000; however, depending upon the monomers and the amount of initiator used semisolid or even solid terminally reactive polymers can be prepared having molecular weights up to 150,000 and higher. The initiator can be employed in amounts as low as 0.25 mhm. but is usually between about 1 and about 100 (mhm.) millimoles per 100 grams of monomer. For liquid polymers the effective initiator level is preferably about 10 to 40 millimoles per 100 grams of monomer and more preferably 10 to 30.

The temperature for the polymerization is generally in the range of —100 to 150° C. and preferably between —75 and 75° C. The particular temperature employed depends on both the monomers and initiators used in the polymerization. The pressure of the reaction need be only that necessary to maintain the materials in the liquid phase.

The polymers that are prepared can range from liquids to solid, rubbery materials. The unquenched polymer solutions can be treated with various reagents to introduce functional groups by replacing the terminal lithium atoms on the polymer molecules resulting from the polymerization. For example the unquenched polymer solutions can be treated with various reagents to introduce terminal functional groups such as —SH, —OH, —COOH, halogen and the like. Treating the unquenched solution with carbon dioxide results in the introduction of carboxy groups in which case carboxy-telechelic polymers are formed. Hydroxy-telechelic polymers can be prepared by treating the unquenched polymer solution with epoxy compounds. Polymer solutions can be reacted with compounds containing active halogen atoms; for example, bis(chloromethyl) ether reacts with the lithium telechelic polymer to produce polymers that contain active chlorine atoms on the ends of the polymer molecule. The resulting terminally reactive polymers can then be recovered and coupled with specific reagents and curing systems either with or without conventional curatives such as sulfur or dicumyl peroxide. For example, carboxy-telechelic polymers can be coupled with tri(aziridinyl)phosphine oxides or sulfides such as tri(2-methyl-1-aziridinyl)phosphine oxide, and hydroxy-telechelic polymers can be coupled with polyisocyanates such as tolylene-2,4-diisocyanate.

As described above the method of my invention provides a process whereby dilithium initiators prepared in a polar solvent medium can be employed for the preparation of conjugated diene polymers having a low vinyl content. An essential feature is to replace all or a major portion of the polar solvent with a hydrocarbon diluent in which the polymerization is then effected. Cycloaliphatic hydrocarbon diluents such as cyclohexane and methylcyclohexane are preferred for the production of polymers having as low a vinyl content as possible. Aliphatic and aromatic hydrocarbon solvents can also be used. The polymer products resulting can range from liquids to solids and the liquid polymers can subsequently be cured to form solids. Fillers such as carbon black or minerals can be incorporated in the polymer if desired and the polymers can be compounded with the coupling and/or curing agents or other fillers in a conventional manner using a roll mill or a Banbury mixer. The resulting products are useful as adhesives, potting compounds, sealants, tread stocks and for making many types of molded objects.

The advantages of my invention are demonstrated by the following examples. In these examples, the specific conditions and materials are presented as being typical and should not be construed to limit my invention unduly.

Example I

A lithium-2,3-dimethyl-1,3-butadiene adduct was prepared in accordance with the following formulation:

| | |
|---|---|
| 2,3-dimethyl-1,3-butadiene, mole | 0.8 |
| Lithium wire, gram atoms | 3.2 |
| Trans-stilbene, mole | 0.02 |
| Diethyl ether, ml | 600 |
| Concentration of diene solution, M | 1.2 |
| Temperature, °F. | 75 |
| Time, hours | 5 |
| Molarity of adduct | 0.43 |
| Dimethylbutadiene units/2Li, average | 2.8 |

The reaction was effected in an atmosphere of nitrogen. The materials were charged to a flask and stirred vigorously throughout the reaction period. At the conclusion of the reaction, a sample of the material was titrated with 0.1 N HCl in order to determine the molarity.

Three hundred eighty milliliters of diethyl ether was removed from the reaction mixture by distillation, 600 milliliters of toluene was added, and 270 milliliters more of the solvent distilled. The final concentration of the solution, determined by HCl titration, was found to be 0.45 molar.

The lithium-dimethylbutadiene adduct was employed for the polymerization of butadiene. The following polymerization recipe was used:

| | |
|---|---|
| 1,3-butadiene, parts by weight | 100 |
| Toluene, parts by weight | 1290 |
| Initiator, mmoles | 20 |
| Temperature, °F. | 122 |
| Time, hours | 4 |
| Conversion | Quantitative |

Toluene was charged first and the reactor was then purged with nitrogen. Butadiene was introduced followed by the initiator.

After a 4-hour polymerization period, the polymer was carbonated using a T-tube. Carbon dioxide, under a pressure of 15–18 p.s.i.g., and the polymer solution were fed into separate arms of the tube where they were mixed. Transfer of the polymer solution from the reactor into the T-tube was effected by nitrogen under a pressure of 20 p.s.i.g. An instantaneous reaction occurred upon contact of carbon dioxide with the lithium-containing polymer. The reaction mixture was transferred to an open vessel through the third arm of the tube. An excess of dilute hydrochloric acid was added, the aqueous and organic phases were separated, the organic phase was washed with water, and the carboxy-containing polymer was recovered by evaporation of the solvent. The product was a liquid and had the following physical properties:

| | |
|---|---|
| Brookfield viscosity, poises | 1076 |
| Carboxy contents, wt. percent | 0.96 |
| Microstructure, percent trans | 49.1 |
| Vinyl | 10.4 |

Another run was made in which the ether was not removed after preparation of the lithium-dimethylbutadiene adduct. In this run a mixture of 0.4 mole 2,3-dimethyl-1,3-butadiene, 1.6 gram atoms of lithium wire, and 325 milliliters of diethyl ether was refluxed for 4.5 hours, while being stirred vigorously, and then allowed to stand overnight at room temperature. The adduct had a molarity of 0.42. It was used as an initiator for the polymerization of butadiene. The recipe was the same as in the foregoing run except that 17 millimoles of initiator was used instead of 20 millimoles. Quantitative conversion was obtained in 0.5 hour. The polymer was carbonated as described above. It was a liquid product which had a vinyl content of 35.9 percent and a transcontent of 37.4. These data demonstrate the great reduction of vinyl content that can be obtained by reducing the quantity of ether in the polymerization system.

Example II

The following quantities of materials were employed for preparing an adduct of lithium with dimethylbutadiene:

| | |
|---|---|
| 2,3-dimethyl-1,3-butadiene, mole | 0.8 |
| Lithium wire | Excess |
| Trans-silbene, mole | 0.03 |
| Diethyl ether, ml. | 800 |
| Concentration of diene solution, M | 0.9 |
| Temperature, °F. | 75 |
| Time, hours | 2 |

The reaction was effected in an atmosphere of nitrogen in the manner described in Example I. After two hours, 0.4 mole of dimethylbutadiene was introduced and one hour later another 0.4 mole of dimethylbutadiene was added. The total amount of dimethylbutadiene charged was 1.6 moles. After the second increment was added, the materials were allowed to react two more hours. The ether was distilled under a constant flow of argon. The solid residue was dissolved in one liter of cyclohexane to give a 0.22 molar solution. Calculation shows that there was an average of 6.2 dimethylbutadiene units/2Li. This material was used as an initiator for the polymerization of butadiene. The polymerization recipe was as follows:

| | |
|---|---|
| 1,3-butadiene, parts by weight | 100 |
| Cyclohexane, parts by weight | 1000 |
| Initiator, mmoles | 22 |
| Temperature, °F. | 122 |
| Time, hours | 2.5 |
| Conversion, percent | Quantitative |

Cyclohexane was charged first, the reactor was purged with nitrogen, butadiene was added, and then the initiator. The polymer was carbonated in the manner described in Example I. The liquid polymer had the following properties:

| | |
|---|---|
| Brookfield viscosity, poises | 480 |
| Carboxy content, wt. percent | 1.35 |
| Microstructure, percent: | |
| Vinyl | 18.8 |
| Trans | 44.5 |

The above data demonstrate that the polar solvent in which the initiator is prepared can be successfully removed by taking care to avoid contact of the initiator with the air. In this case a constant flow of argon is maintained over the initiator during the distillation of the ether. A solid residue was obtained which was then dissolved in the hydrocarbon. The polymer which was subsequently obtained had a very low vinyl content.

Example III

The lithium-dimethylbutadiene initiator described in Example II was employed for the production of rubbery polyisoprene using the following polymerization recipe:

| | |
|---|---|
| Isoprene, parts by weight | 100 |
| Cyclohexane, parts by weight | 1560 |
| Initiator, mmoles | 0.8 |
| Temperature, °F. | 122 |
| Time, hours | 3 |
| Conversion, percent | 77 |

The charge order was the same as in Example II. At the conclusion of the polymerization, a ten-fold excess of ethylene oxide (with respect to the initiator) was added. The mixture was stirred while the temperature was held at 122° F. for 48 hours. It was then acidified with HCl, washed with water, and the polymer coagulated with isopropanol. The product, which was a soft rubber containing terminal hydroxy groups, had the following properties:

| | |
|---|---|
| Inherent viscosity | 1.02 |
| Gel, percent | 0 |
| Mooney (ML-4 at 212° F.) | 5 |
| Microstructure, percent: | |
| 1,4-addition (predominantly cis) | 88.6 |
| 3,4-addition | 11.4 |

The rubber was compounded in accordance with the following formulations:

| | Parts by Weight | |
|---|---|---|
| | 1 | 2 |
| Rubber [1] | 100 | 100 |
| Philblack O [2] | 50 | 50 |
| Dicumyl peroxide [2] | 1.84 | 1.84 |
| Tolylene-2, 4-diisocyanate | | 1.0 |

[1] High abrasion furnace black.
[2] Di-Cup 40 C: A product containing 40% active dicumyl peroxide and 60% precipitated CaCO₃. Amount charged was 4-6 parts.

The stocks, after curing 30 minutes at 307° F., had the following properties:

| | 1 | 2 |
|---|---|---|
| Vr [1] | 0.291 | 0.310 |
| 300% Modulus, p.s.i. | 1,300 | 1,510 |
| Tensile, p.s.i. | 1,940 | 1,960 |
| Elongation, percent | 410 | 370 |
| Shore hardness | 53 | 60 |
| ΔT, °F. | 63.5 | 49.7 |
| Resilience, percent | 60.6 | 69.4 |

[1] Volume fraction of polymer in swollen stock determined as described in Rubber World, 135, No. 1, 67-73 (1956). This is an indication of the degree of crosslinking in the polymer.

As the above data show, the polymerization initiator from which the polar solvent has been removed polymerizes isoprene to form a polymer of very low vinyl content (11.4%). This polymer can then be compounded with carbon black and dicumyl peroxide to produce a highly useful product having a good balance of physical properties. Contacting the polymerization mixture with ethylene oxide and then with aqueous HCl, replaced the lithium atoms with hydroxyethyl groups. The hydroxy containing polymers were then coupled in run 2 with tolylene-2,4-diisocyanate. It is to be noted that in run 2 a higher degree of crosslinking was obtained resulting in a harder polymer with a lower degree of heat buildup. Tensile strength was not substantially changed, but modulus increased and elongation was reduced.

Example IV

A lithium-dimethylbutadiene adduct was prepared in the following manner:

Initial charge:

| | |
|---|---|
| 2,3-dimethyl-1,3-butadiene, mole | 0.8 |
| Lithium wire, gram atoms | 3.2 |
| Trans-stilbene, mole | 0.03 |
| Diethyl ether, ml. | 1000 |
| Concentration of diene solution, M | 0.7 |
| Temperature, °F. | Reflux |

The reaction was effected in an atmosphere of nitrogen. The reactants were stirred vigorously while the material was refluxed for two hours. Dimethylbutadiene (0.4 mole) was added, refluxing and stirring were continued for one hour, another 0.4-mole portion of dimethylbutadiene was introduced, and the reaction was continued for two more hours. Titration of a portion of the mixture with 0.1 N HCl showed the solution to be 0.32 molar. The average dimethylbutadiene units/2Li in this solution was 4.25. Ether was removed by blowing a stream of pre-purified nitrogen through the solution. The remaining material was dissolved in cyclohexane to give a solution having a molarity of 0.15. This adduct was employed as the initiator for the polymerization of isoprene in accordance with the following recipe:

| | |
|---|---|
| Isoprene, parts by weight | 100 |
| Cyclohexane, parts by weight | 780 |
| Initiator, mmoles | 0.75 |
| Temperature, °F. | 122 |
| Time, hours | 2 |
| Conversion, percent | 76 |

The solvent was charged first, the reactor was purged with nitrogen, the initiator was added, and then the isoprene. This process yielded a rubbery polymer. The produce was treated with ethylene oxide at 122° F. for 16 hours using 75 millimoles per 100 grams of polymer. The mixture was acidified with HCl, washed with water, and the hydroxy-containing polymer coagulated with isopropanol. Properties of the polyisoprene are shown below:

| | OH-Containing polymer |
|---|---|
| Inherent viscosity | 2.71 |
| Mooney (ML-4 at 212° F.) | 70 |
| Gel, percent | 0 |
| Microstructure, percent: | |
| 1,4-addition (predominantly cis) | 87.4 |
| 3,4-addition | 12.6 |

The above data show the formation of a high Mooney polyisoprene according to my invention with the polymer having a vinyl content of only 12.6%.

Example V

Lithium was reacted with dimethylbutadiene using the following proportions of ingredients:

| | |
|---|---|
| 2,3-dimethyl-1,3-butadiene, mole | 0.4 |
| Lithium wire, gram atom | 0.8 |
| Trans-stilbene, mole | 0.01 |
| Diethyl ether, ml. | 350 |
| Concentration of diene solution, M | 1.0 |
| Temperature, °F. | 75 |
| Time, hours | 3 |
| Molarity of adduct | 0.5 |
| Dimethylbutadiene units/2Li, average | 2 |

The adduct was prepared by stirring the reactants vigorously throughout the three-hour reaction period. This adduct was not soluble in cyclohexane and only partially soluble in toluene. Two-tenths mols of dimethylbutadiene was added, the mixture was stirred another hour, and a second 0.2 mole of dimethylbutadiene was introduced. After stirring an additional hour, a portion of the solution was titrated with 0.1 N HCl and found to be 0.89 molar. Calculation showed this material to contain an average of two dimethylbutadiene units/2Li. Two hundred milliliters of diethyl ether was removed by distillation and 0.8 mole of 1,3-butadiene was added and allowed to polymerize. This amount of butadiene was sufficient to give an adduct having the formula $$Li(C_4H_6)(DMBD)_2(C_4H_6)Li$$

The reaction product was dissolved in 500 milliliters of toluene. Titration of a sample of this mixture with 0.1 N HCl showed that the solution was 0.4 molar. This adduct was employed as the initiator for the polymerization of butadiene. Recipes were as follows:

|  | A | B |
|---|---|---|
| Butadiene, parts by weight | 100 | 100 |
| Toluene, parts by weight | 1,200 |  |
| Cyclohexane, parts by weight |  | 1,200 |
| Initiator, mmoles | 20 | 20 |
| Temperature, °F | 122 | 122 |
| Time, hours | 2 | 2 |
| Conversion, percent | 100 | 100 |

The same charge order was used as in the preceding examples. Products from both runs were liquids. They were carbonated as described in Example I. Properties of the carboxy-containing polymers were as follows:

| Product | Brookfield Visc. at 77° F., Poises | COOH Content, Percent | Microstructure, Percent | |
|---|---|---|---|---|
|  |  |  | Vinyl | Trans |
| A | 360 | 1.22 | 27.4 | 46.8 |
| B | 360 | 1.26 | 22.6 | 44.4 |

The above data show the solubilizing of the dilithium dimethylbutadiene adduct by the partial polymerization of 1,3-butadiene. While the original adduct was not soluble in cyclohexane and only partially soluble in toluene, the final initiator was soluble in both diluents. A carboxy-telechelic polymer was produced with a vinyl content still lower than that shown in Example I when all of the polymerization was carried out without removal of any of the diethyl ether used in the formation of the initiator.

Example VI

A lithium-stilbene adduct was prepared in accordance with the following recipe:

| Diethyl ether, ml. | 600 |
|---|---|
| Tetrahydrofuran, ml. | 60 |
| Stilbene [1], mole (27 grams) | 0.15 |
| Lithium wire, grams | 5.2 |
| Time, hours | 1 |
| Temperature, °F. | 122 |
| Molarity of vinyl solution | 0.218 |

Three runs were made using this lithium-stilbene adduct in a mixture of diethyl ether and tetrahydrofuran.

In the first and second runs the lithium-stilbene adduct was used as the initiator for the polymerization of butadiene with the recipe as follows: [1] 1,2-diphenylethane.

| 1,3-butadiene, parts by weight | 100 |
|---|---|
| Toluene, parts by weight | 864 |
| 1,2-dilithio-1,2-diphenylethane, mmoles | 40 |
| Temperature, °F. | 122 |
| Time, hours | 2 |
| Conversion, percent | 100 |

Charge order of the first run: toluene; nitrogen purge; initiator; butadiene.

After polymerization the mixture was carbonated by contacting the polymer solution with gaseous $CO_2$ (T-tube technique). It was then treated with dilute hydrochloric acid and the polymer was washed and dried. It had a carboxy content of 2.37 percent and a vinyl content of 49.7 percent.

Charge order of the second run: toluene; nitrogen purge; initiator; mixture held at 50–65° C., while 300 ml. of solvent was removed under vacuum; butadiene.

After polymerization, the mixture was carbonated and treated with dilute hydrochloric acid and the product recovered as in the preceding run. It had a carboxy content of 2.24 percent and a vinyl content of 42.5 percent.

In the third run 45 milliliters of the 1,2-dilithio-1,2-diphenylethane (9.9 mmoles, lithium-stilbene adduct) was added to 200 milliliters of dry n-pentane and a small amount (4 ml.) of 1,3-butadiene was introduced. A dark brown gel-like solid formed immediately. The liquid was removed by a siphon and 200 ml. of toluene was added to the brown material without the solid being exposed to the air. It was dissolved in the toluene by shaking the mixture while it was heated to 50° C. This solution (0.05 molar) was used as the initiator for polymerization of butadiene in accordance with the following recipe:

| 1,3-butadiene, parts by weight | 100 |
|---|---|
| Toluene, parts by weight | 864 |
| 1,2-dilithio-1,2-diphenylethane, mmoles | 5 |
| Temperature, °F. | 122 |
| Time, hours | 1.5 |
| Conversion, percent | 100 |

Charge order: toluene; nitrogen purge; butadiene; initiator.

The product was gel free, had an inherent viscosity of 1.35, a vinyl content of 30.8 percent, and a trans content of 43.8 percent.

As shown above polybutadiene prepared by polymerizing butadiene in the presence of a lithium-stilbene adduct can be reduced in vinyl content by removal of at least a portion of the polar solvent employed in the formation of the adduct. In the third run the adduct was solubilized by the addition of a small amount of 1,3-butadiene so that substantially all of the polar solvent could be removed and replaced with toluene.

Example VII

An initiator was prepared according to the following recipe:

| Lithium | g | 2 |
|---|---|---|
| Methylnaphthalene [1] | g | 14.2 |
| Isoprene | g | 7 |
| Ethyl ether | ml | 94 |
| Temperature, °F | | −15 |
| Time, hours | | 48 |
| Final concentration | molar | 1.43 |

[1] A commercial mixture of 1-methylnaphthalene and 2-methylnaphthalene.

Four 26-ounce beverage bottles were dried and capped and to each was charged 8.75 ml. (0.0125 mole) of the above initiator solution. In Runs No. 1 and No. 2, the catalyst was solubilized by addition of 90 mmoles of butadiene. Then, 50 cc. of benzene was added to Run No. 2 and a total of 35 cc. of solvent was distilled to entrain the ether. The same amount of benzene was added to Runs Nos. 3 and 4 and again 35 cc. was distilled from each. Then 90 mmoles of butadiene was added to Run 4 to solubilize the initiator. Finally, all four runs were completed by addition of solvent and monomer so that the final polymerization recipes were:

| Butadiene | 100 |
|---|---|
| Cyclohexane | 780 |
| Initiator mmoles | 25.0 |
| Temperature, °F. | 122 |
| Time, hours | 3 |

The polymers were carboxylated with CO₂, recovered and analyzed with the following results:

| Run No. | Initiator | Viscosity Poise (77° F.) | Viscosity Inherent | Carboxyl Content, Percent | Unsaturation, Percent Trans | Unsaturation, Percent Vinyl |
| --- | --- | --- | --- | --- | --- | --- |
| 1 | Solubilized, not stripped | 700 | 0.25 | 1.10 | 40.3 | 29.8 |
| 2 | Solubilized, stripped | 816 | 0.27 | 1.01 | 47.7 | 18.8 |
| 3 | Stripped, not solubilized | >4,000 | 0.49 | 0.94 | 48.1 | 18.5 |
| 4 | Stripped, solubilized | >4,000 | 0.77 | 0.42 | 45.4 | 18.5 |

Referring to the above data, the invention is illustrated by Run No. 2. Run Nos. 1, 3 and 4 illustrate the other possible variations of initiator recovery and use, none of which are as effective in producing the desired results as is the procedure of the invention. In Run No. 1 the ether was not removed although the initiator was solubilized. A low viscosity polymer, having good carboxy content, was obtained but the vinyl unsaturation was undesirably high. In Run Nos. 3 and 4 the ether was removed, resulting in a polymer having low vinyl unsaturation. In Run No. 3 the initiator was not solubilized while in Run No. 4 it was solubilized but not until after the ether had been removed. In both Runs 3 and 4, product had an undesirably high viscosity and, particularly in Run No. 4, a low carboxy content. These data demonstrate, therefore, the importance of solubilizing the initiator before removing the ether.

The microstructures (vinyl content) of the polymers described in the above examples were determined as follows:

The polymer samples were dissolved in carbon disulfide to form a solution having 25 grams of polymer per liter of solution. The infrared spectrum of each of the solutions (percent transmission) was then determined in a commercial infrared spectrometer.

For the polymers of Examples I, II and V the percent of the total unsaturation present as trans 1,4- was calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_o/I$); $t$=path length (centimeters); and $c$=concentration (mols double bond/liter). The extinction was determined at the 10.35 micron band and the extinction coefficient was 146 (liters-mols$^{-1}$-centimeters$^{-1}$).

The percent of the total unsaturation as 1,2- (or vinyl) was calculated according to the above equation, using the 11.0 micron band and an extinction coefficient of 209 (liters-mols$^{-1}$-centimeters$^{-1}$).

The percent of the total unsaturation present as cis 1,4- was obtained by subtracting the trans 1,4- and 1,2- (vinyl) determined according to the above procedures, from the theoretical unsaturation, assuming one double bond per each C₄ unit in the polymer.

For the polymers of Example VI the microstructures were determined on a Perkin-Elmer Model 21 spectrophotometer as described above except that the extinction coefficients used were 126 for trans and 173 for vinyl.

The contents of 1,4- and 3,4-addition products in the polyisoprenes of Examples III and IV were calculated by measurement of the intensities of the 8.90 micron and 11.25 micron bands, respectively, recorded by a Perkin-Elmer Infracord. Natural rubber which is assumed to contain 98 percent cis and 2 percent of the 3,4-addition product was used as a standard and the cis and isopropenyl contents of the polyisoprene were determined by comparing the aforementioned intensities with those of the natural rubber. The 3,4-addition products (isopropenyl) are given as thus determined while the 1,4-addition, which was predominantly cis, was determined by difference.

As will be apparent to those skilled in the art modifications and variations can be made in my invention without departing from the spirit or scope thereof.

I claim:

1. A process for making a polymer which comprises preparing a hydrocarbon insoluble polymerization initiator having the formula $RLi_x$ where $x$ is an integer of 2 to 4 and R is a hydrocarbon radical selected from the group consisting of aliphatic, cycloaliphatic and aromatic radicals in an ether solvent having the formula R'OR' wherein R' is an alkyl group containing 2 to 12 carbon atoms, modifying said initiator by contacting same with sufficient conjugated diene having 4 to 8 carbon atoms per molecule to make the modified initiator soluble in a liquid hydrocarbon selected from the group consisting of paraffins, cycloparaffins and aromatics, the amount of conjugated diene added to modify said initiator being substantially not more than required to make said modified initiator soluble in said liquid hydrocarbon, removing said ether solvent, dissolving said initiator in said liquid hydrocarbon, and thereafter contacting the resulting solution of initiator with a conjugated diene having 4 to 12 carbon atoms per molecule under polymerization conditions in said liquid hydrocarbon diluent and in the substantial absence of said ether.

2. The process of claim 1 wherein said liquid hydrocarbon has a higher boiling point than said ether and is added to the initiator-ether solution after modification of said initiator but before removing said ether.

3. The method according to claim 1 wherein said liquid hydrocarbon diluent is a cycloaliphatic hydrocarbon.

4. The method of claim 1 wherein said initiator is a dilithium adduct of stilbene, said solubilizing conjugated diene is 1,3-butadiene, and said ether is diethyl ether.

5. A process for making polymer which comprises contacting lithium with a material selected from the group consisting of organic polyhalides, condensed ring aromatic compounds, and polyaryl-substituted ethylenes in an ether solvent, adding to the resulting product in the presence of said ether solvent an amount of conjugated diene sufficient to form a hydrocarbon-soluble organo polylithium initiator, said amount of conjugated diene being substantially not more than required to make said initiator soluble in said hydrocarbon, replacing said ether solvent with hydrocarbon solvent, and thereafter polymerizing conjugated diene in said hydrocarbon solvent with said initiator.

6. The process of claim 5 wherein said material is methylnaphthalene and said conjugated diene is 1,3-butadiene.

7. The process of claim 6 wherein isoprene is present during the contacting of lithium and methylnaphthalene.

8. A process for making polymer which comprises forming a hydrocarbon insoluble organo polylithium polymerization initiator in an ether solvent, contacting said initiator in the presence of said solvent with sufficient conjugated diene to form a hydrocarbon soluble organo polylithium polymerization initiator, the amount of conjugated diene added being substantially not more than required to make said initiator soluble in said hydrocarbon, replacing said ether solvent with hydrocarbon solvent, and polymerizing conjugated diene with said hydrocarbon soluble initiator in said hydrocarbon solvent in the substantial absence of ether solvent.

9. A process for making a low-viscosity, low vinyl polybutadiene which comprises forming an adduct of lithium and methylnaphthalene in ether, reacting said adduct with a diene selected from at least one of the group consisting of 1,3-butadiene and isoprene to form a hydrocarbon soluble initiator, removing the ether and dissolving the reaction product of said diene and adduct in hydrocarbon solvent, and contacting said reaction product in said hydrocarbon solvent with sufficient 1,3-butadiene to form a liquid polymer, the amount of said diene added to said adduct to form said hydrocarbon soluble initiator being less than 20 weight percent of said 1,3-butadiene subsequently added.

References Cited

UNITED STATES PATENTS

| | | | |
|---|---|---|---|
| 2,947,793 | 8/1960 | Eberly | 260—665 |
| 3,135,716 | 6/1964 | Uraneck et al. | 260—665 |

OTHER REFERENCES

Ziegler: "Rubber Chemistry and Technology," vol. 11 (1938) pp. 501–7.

PAUL M. COUGHLAN, JR., *Primary Examiner.*